United States Patent
Shen

(10) Patent No.: US 12,455,125 B2
(45) Date of Patent: Oct. 28, 2025

(54) WATER BLOCK PRESSURE REGULATION STRUCTURE

(71) Applicant: ASIA VITAL COMPONENTS CO., LTD., New Taipei (TW)

(72) Inventor: Ching-Hang Shen, New Taipei (TW)

(73) Assignee: ASIA VITAL COMPONENTS CO., LTD., New Taipei (TW)

(*) Notice: Subject to any disclaimer, the term of this patent is extended or adjusted under 35 U.S.C. 154(b) by 114 days.

(21) Appl. No.: 18/623,769

(22) Filed: Apr. 1, 2024

(65) Prior Publication Data

US 2025/0283675 A1     Sep. 11, 2025

(30) Foreign Application Priority Data

Mar. 8, 2024   (TW) .................................. 113108707

(51) Int. Cl.
*F28F 27/00*    (2006.01)
*G05D 16/04*    (2006.01)
(Continued)

(52) U.S. Cl.
CPC ......... *F28F 27/00* (2013.01); *G05D 16/0404* (2019.01); *G05D 16/103* (2013.01);
(Continued)

(58) Field of Classification Search
CPC .. F28F 27/00; F28F 2265/12; G05D 16/0404; G05D 16/103; H05K 7/20272; H05K 7/20254; H05K 7/20281
(Continued)

(56) References Cited

U.S. PATENT DOCUMENTS

| 11,963,330 B2 * | 4/2024 | Huang ................. H05K 7/2039 |
| 2013/0186492 A1* | 7/2013 | Deng ...................... F23D 14/48 |
| | | 137/624.27 |

(Continued)

FOREIGN PATENT DOCUMENTS

| TW | 587777 U | 5/2004 |
| TW | M573931 U | 2/2019 |

(Continued)

OTHER PUBLICATIONS

Search Report dated Jul. 5, 2024 issued by Taiwan Intellectual Property Office for counterpart application No. 113108707.

*Primary Examiner* — Joel M Attey
(74) *Attorney, Agent, or Firm* — Demian K. Jackson; Jackson IPG PLLC

(57) ABSTRACT

A water block pressure regulation structure includes a top cover internally defining a water-out compartment, a pressure reduction chamber and a water-in compartment; a heat absorbing member; and a partitioning plate superposed on the heat absorbing member to define a heat exchange chamber between them, and including a buffer space communicable with the heat exchange chamber via first and second bores formed on the partitioning plate. The first and second bores are openable and closeable by first and second valves fitted therein, respectively. The water-in and water-out compartments communicate with the heat exchange chamber via first and second penetrating openings on the partitioning plate. When the heat exchange chamber internally has high pressure or insufficient cooling liquid, the first and second valves automatically open to communicate the buffer space with the heat exchange chamber, and accordingly regulate the pressure and cooling liquid in the heat exchange chamber.

8 Claims, 8 Drawing Sheets

(51) Int. Cl.
   *G05D 16/10*   (2006.01)
   *H05K 7/20*   (2006.01)
(52) U.S. Cl.
   CPC ...... *H05K 7/20272* (2013.01); *F28F 2265/12* (2013.01); *H05K 7/20254* (2013.01); *H05K 7/20281* (2013.01)
(58) Field of Classification Search
   USPC ........................................... 165/104.33, 80.4
   See application file for complete search history.

(56) References Cited

U.S. PATENT DOCUMENTS

2022/0418155 A1* 12/2022 Chen .................. H05K 7/20281
2023/0320029 A1* 10/2023 Kanai ................ H05K 7/20263
                                                                361/679.47

FOREIGN PATENT DOCUMENTS

| TW | M586040 U | 11/2019 |
| TW | M655651 U | 5/2024 |

* cited by examiner along line a-a

WATER BLOCK PRESSURE REGULATION STRUCTURE

This application claims the priority benefit of Taiwan patent application number 113108707 filed on Mar. 8, 2024.

FIELD OF THE INVENTION

The present invention relates to the field of water block, and more particularly, to a water block pressure regulation structure.

BACKGROUND OF THE INVENTION

The existing water cooling system includes some prerequisite components, such as water block, water radiator, water pump and pipes. The water block, the water radiator and the water pump are connected to one another by the pipes to form a water liquid circulation path in the form of a closed circuit. The water block is in contact with a heat source to absorb heat produced by the heat source. The absorbed heat is finally carried away by a working fluid to achieve the effect of heat exchange. The water pump is mainly used to drive the working fluid to circulate through the whole closed circuit; and the water radiator is a unit mainly used to enhance the cooling efficiency of the working fluid in the whole circulation path.

When the working fluid (i.e. a cooling liquid), such as water, circulates to achieve the purpose of cooling, the cooling liquid would have an increased volume due to thermal expansion under increasing temperature of the cooling liquid and accordingly, reduced density. When the cooling liquid filled in the closed circuit expands in volume, it would possibly affect different components in the water cooling system to result in burst and leakage of the water cooling system. For example, the water block or the water radiator might be pushed by the expanded cooling liquid to result in deformed chamber thereof, or the joints of different components with the pipes might burst to separate from each other.

Following problems will occur when the above described states happened:
(1) The water block is deformed and fails to tightly contact with the heat source to thereby result in thermal resistance;
(2) The joints of different components with the pipes in the water cooling system burst to result in separation of components from the pipes and accordingly, leaking of cooling liquid; and
(3) The water radiator would deform to result in poor heat dissipation and accordingly, poor cooling efficiency of the cooling liquid.

Specifically, any one of the above conditions would lead to failure of the whole water cooling system, which would in turn cause damages or oven burn-out of the electronic device or electronic equipment that uses the water cooling system to dissipate heat produced during operation thereof.

Presently, to overcome the above problems, there are manufacturers who provide a pressure relief valve in the water cooling system set to open when the cooling liquid produces increased pressure in a temperature rise condition, so as to balance the internal pressure of the water cooling system automatically. However, the above solution causes another problem, that is, the cooling liquid in the water cooling system would decrease but could not be replenished automatically. When the cooling liquid decreases gradually, the cooling efficiency of the whole water cooling system will drop; and once the cooling liquid is used up, the whole water cooling system would stop working.

It is therefore tried by the inventor to overcome the problems and disadvantages in the prior art water cooling system by developing a water block pressure regulation structure.

SUMMARY OF THE INVENTION

To overcome the problems in the prior art water cooling system, a primary object of the present invention is to provide a water block pressure regulation structure capable of automatically regulating the pressure in the water cooling system.

Another object of the present invention is to provide a water block pressure regulation structure that enables a cooling liquid to flow back to the water cooling system automatically.

To achieve the above and other objects, the water block pressure regulation structure of the present invention includes an upper cover, a partitioning plate, and a heat absorbing member.

The top cover has a pressure reduction chamber and an outlet and an inlet; the pressure reduction chamber includes a water-out compartment and a water-in compartment located at positions corresponding to the outlet and the inlet, respectively; and the partitioning plate is superposed on the heat absorbing member to form a heat exchange chamber between them.

The partitioning plate is provided on one side facing toward the top cover with an upward extended valve receiving section consisting of communicable first zone and second zones. The pressure reduction chamber in the top cover correspondingly encloses the first and the second zone to form an independent buffer space around an outer side of the first and second zones. The partitioning plate is provided with a first and a second bore in the first and the second zone, respectively; and the heat exchange chamber and the buffer space are communicable with each other via the first and the second bore. The partitioning plate further has a first valve and a second valve provided thereon to be set in the first and the second zone, respectively, for opening or closing the first and the second bore, so as to control the communication between the heat exchange chamber and the buffer space. The partitioning plate is provided near the valve receiving section with a first and a second penetrating opening, via which the inlet and outlet of the top cover are communicable with the heat exchange chamber to form a cooling liquid circulation path.

When the cooling liquid in the heat exchange chamber is heated and expanded to excessively increase the pressure in the heat exchange chamber, and when the cooling liquid in the heat exchange chamber is insufficient, the first and the second hole can be opened by the first and the second valve, respectively, so as to communicate the buffer space with the heat exchange chamber to enable regulation of pressure and replenishment of cooling liquid in the heat exchange chamber.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof.

Figure 1A:
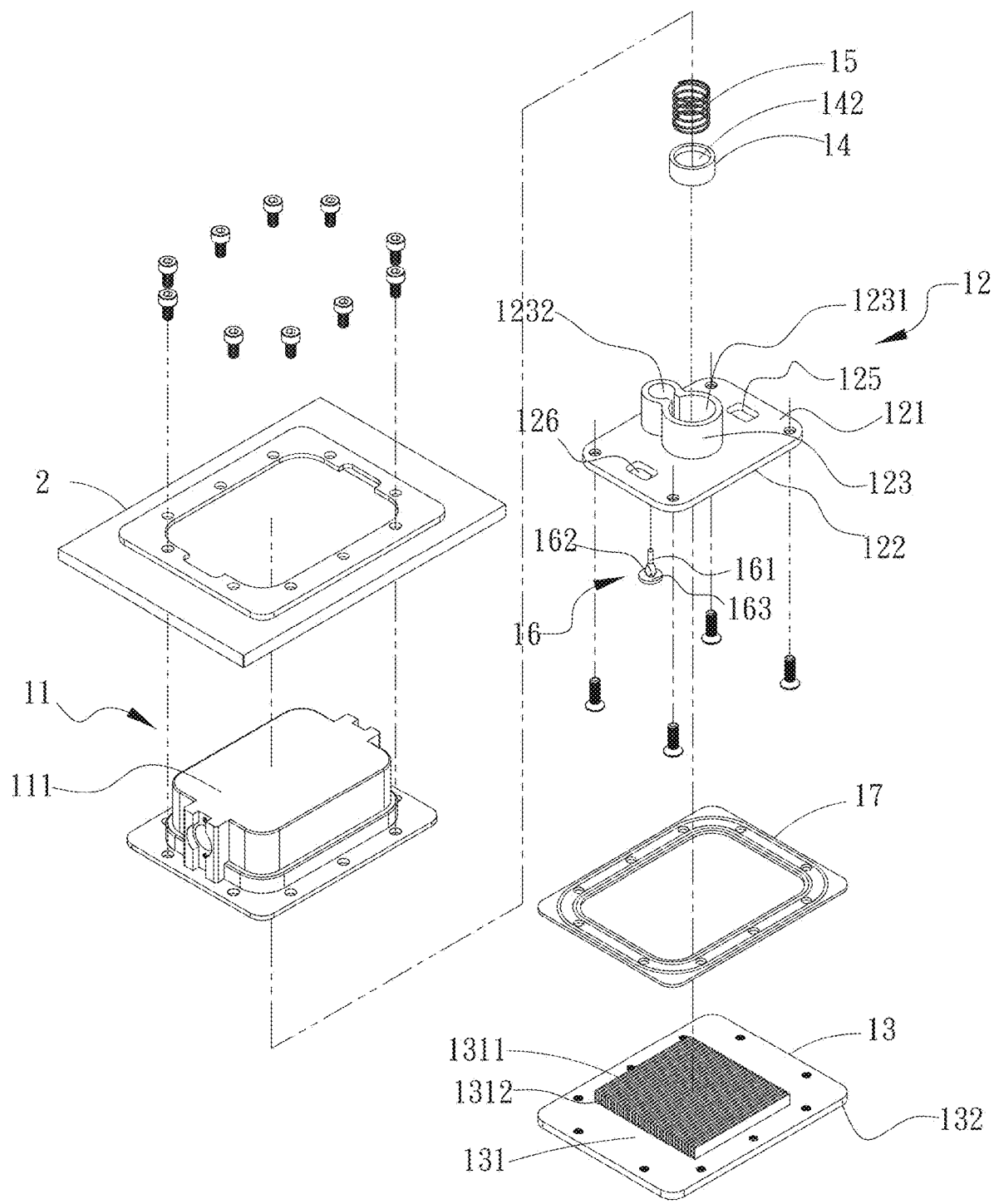
FIG. 1A is a top exploded perspective view of a water block pressure regulation structure of the present invention.
Figure 1B:
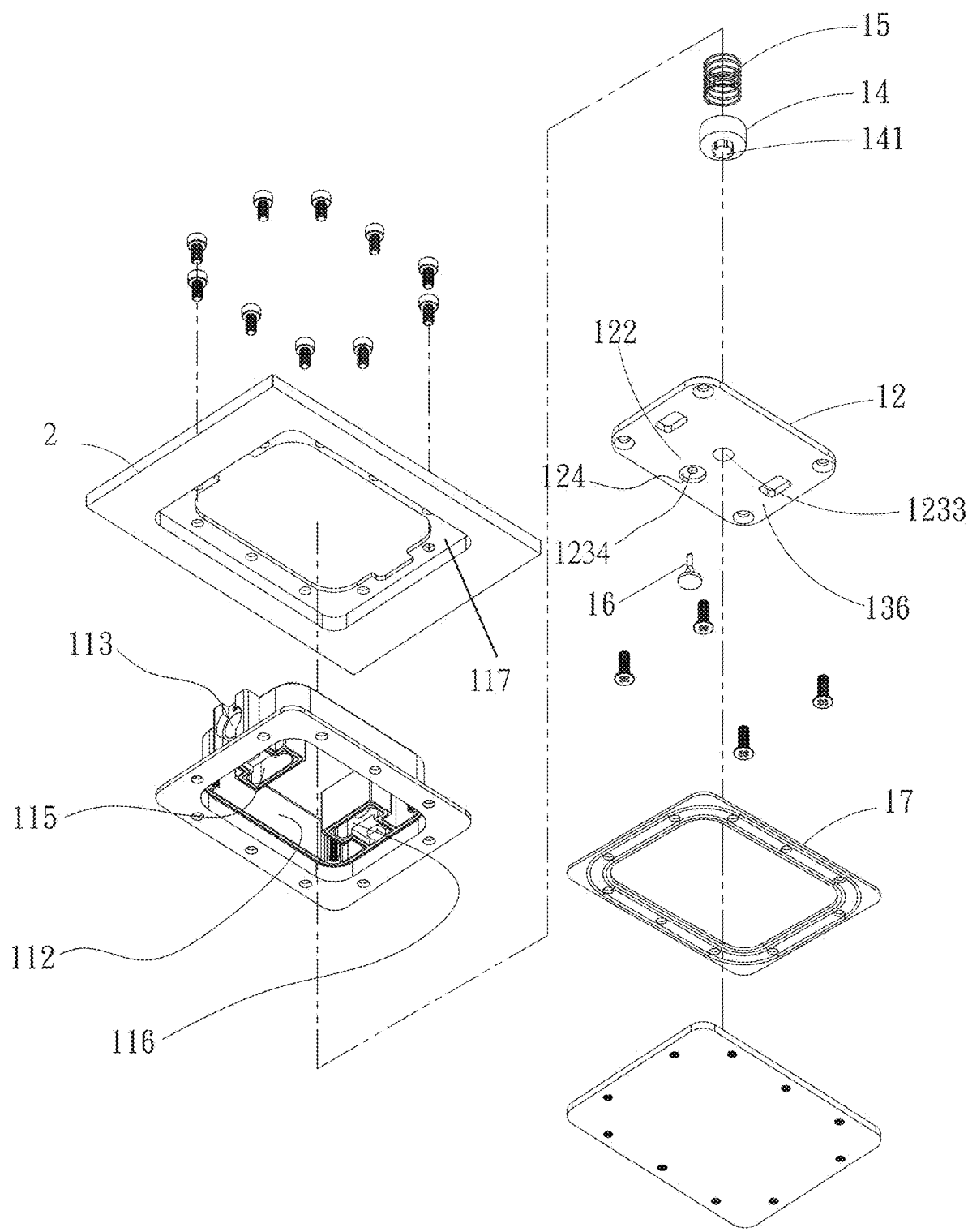
FIG. 1B is a bottom exploded perspective view of the water block pressure regulation structure of the present invention.
Figure 1C:
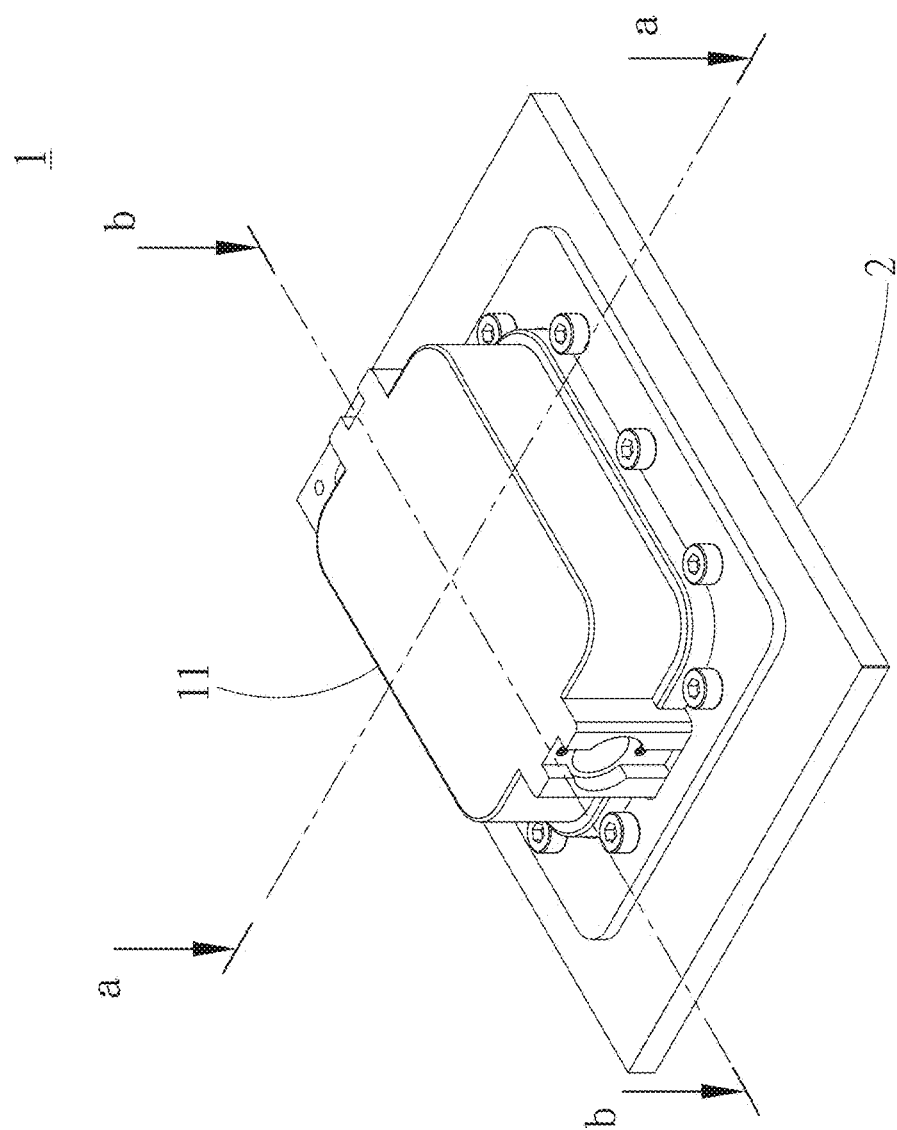
FIG. 1C is am assembled perspective view of the water block pressure regulation structure of the present invention.
Figure 2A:
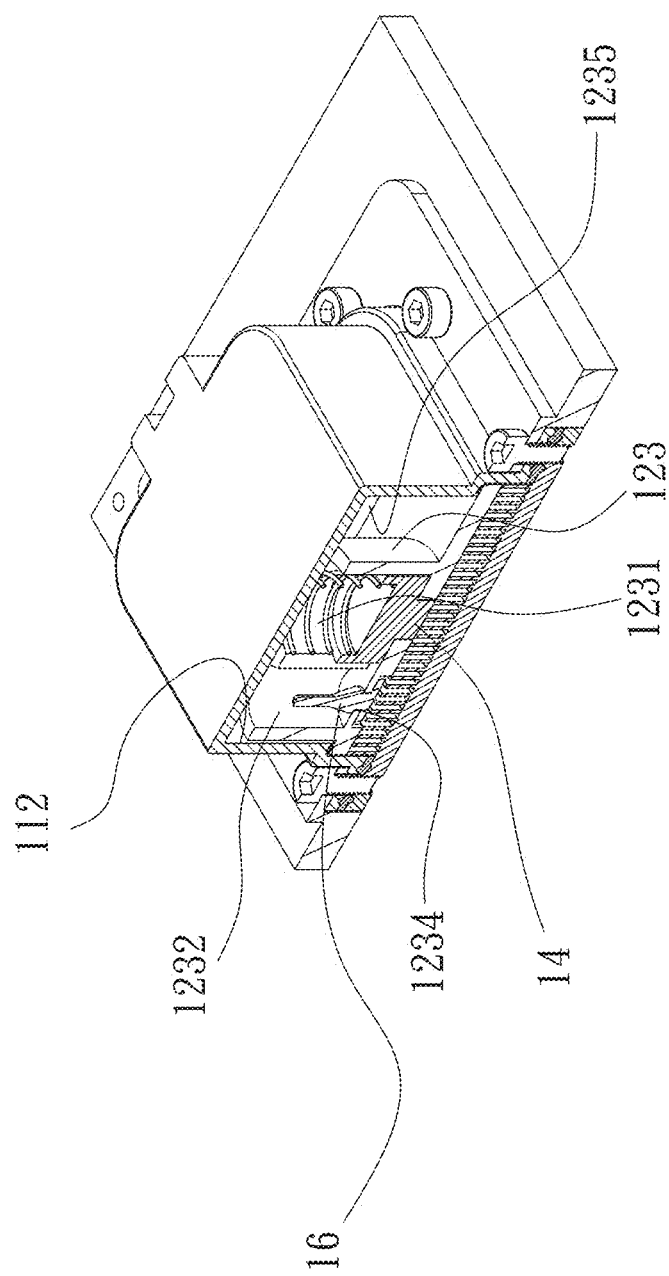
FIG. 2A is a cutaway view taken along line a-a of FIG. 1C.
Figure 2B:
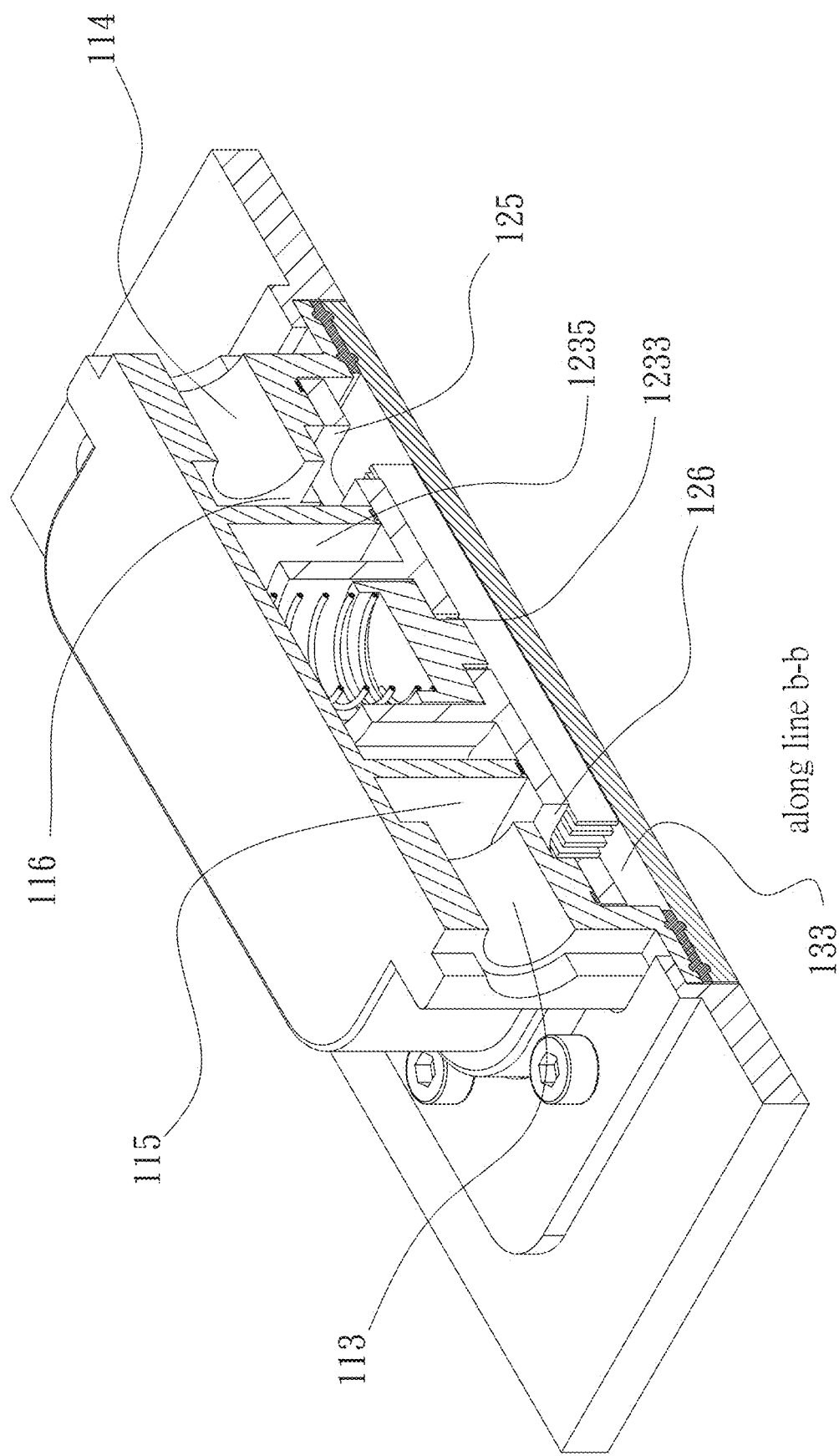
FIG. 2B is a cutaway view taken along line b-b of FIG. 1C.

Please refer to FIGS. 1A, 1B and 1C, which are top exploded perspective view, bottom exploded perspective view and assembled perspective view, respectively, of a water block pressure regulation structure according to an embodiment of the present invention; and to FIGS. 2A and 2B, which are cutaway views taken along line a-a and line b-b of FIG. 1C, respectively. As shown, the present invention includes a water block structure 1, which has a top cover 11, a partitioning plate 12, and a heat absorbing member 13.

Figure 3A:
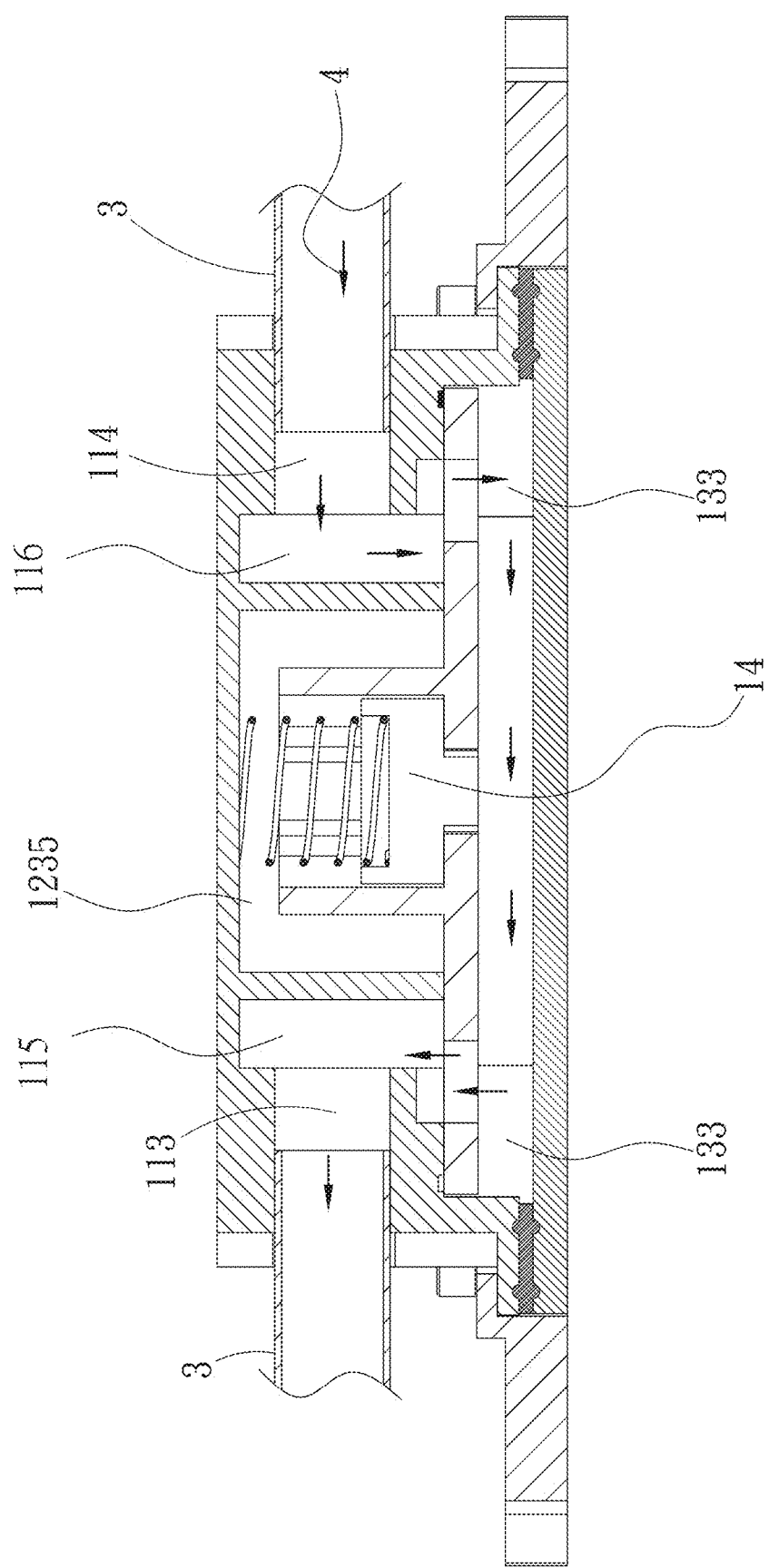
FIG. 3A is a sectional view showing how a cooling liquid flows in the water block of the present invention.

The top cover 11 is a hollow member consisting of an outer shell 111, a pressure reduction chamber 112, and an outlet 113 and an inlet 114. The outer shell 111 is located at an outer side of the top cover 11, and the pressure reduction chamber 112 is located at an inner side of the top cover 11. A water-out compartment 115 and a water-in compartment 116 are formed in the pressure reduction chamber 112 corresponding to and communicable with the outlet 113 and the inlet 114, respectively. The top cover 11 is provided at an open end thereof with a stepped section 117, as indicated in FIG. 3A, which will be discussed in detail later.

The partitioning plate 12 has a first side 121 facing toward the top cover 11 and an opposite second side 122 facing toward the heat absorbing member 13. The partitioning plate 12 is provided on one side (it is the first side 121 in the illustrated embodiment) with an upward extended valve receiving section 123 enclosing a first zone 1231 and a second zone 1232, which are communicable with each other. The partitioning plate 12 is further provided with a first bore 1233 and a second bore 1234 in the first and the second zone 1231, 1232, respectively, to penetrate the first side 121 and the second side 122 of the partitioning plate 12. An area on the partitioning plate 12 near outer edges of the first side 121 is in contact at with the stepped section 117 of the top cover 11.

The first zone 1231 is internally provided with a first valve 14 and an elastic element 15. The first valve 14 has two ends respectively being a protruded portion 141 facing toward the partitioning plate 12 for correspondingly fitting in the first bore 1233, and a recessed portion 142 facing toward the top cover 11 for pressing against the elastic element 15, such that the first valve 14 can open or close the first bore 1233. The second zone 1232 is internally provided with a second valve 16, which includes a valve main body 16, a limiting protrusion 162, and a stopper portion 163. The limiting protrusion 162 and the stopper portion 163 are located at two different sides of the partitioning plate 12. The valve main body 161 upwardly extends through the second bore 1234, such that the stopper portion 163 covers the second bore 1234, which is openable or closeable via the second valve 16. The partitioning plate 12 is provided on the second side 122 with a recess 124 for receiving the stopper portion 163 therein. The partitioning plate 12 is also provided near two opposite sides of the valve receiving section 123 with a first penetrating opening 125 and a second penetrating opening 126, both of the first and the second penetrating opening 125, 126 extend through the partitioning plate 12.

The heat absorbing member 13 has a heat dissipation surface 131 and a heat absorption surface 132 located at an upper side and a lower side of the heat absorbing member 13, respectively. The heat dissipation surface 131 has a plurality of radiating fins 1311 provided thereon, and has a heat exchange flow passage 1312 formed between two adjacent radiating fins 1311. The partitioning plate 12 is superposed on the heat absorption member 13, and both the partitioning plate 12 and the heat absorption member 13 are covered in the outer shell 111 of the top cover 11, such that the top cover 11, the partitioning plate 12 and the heat absorption member 13 are joined with each other to form a water block structure 1.

The pressure reduction chamber 112 in the top cover 11 is located on an outer side of the first and the second zone 1231, 1232 to cover them correspondingly, such that an independent buffer space 1235 is defined between the top cover 11 and the valve receiving section 123, and a heat exchange chamber 133 is defined between the heat dissipation surface 131 of the heat absorption member 13 and the second side 122 of the partitioning plate 12. The buffer space 1235 and the heat exchange chamber 133 are communicable with each other via the first and the second bore 1233, 1234, while the first and the second bore 1233, 1234 are controlled by the first and the second valve 14, 16 to open or close.

The water-in and the water-out compartments 116, 115 are communicable with the heat exchange chamber 113 via the first and the second penetrating opening 125, 126, respectively, such that the heat exchange chamber 133, the water-in compartment 116, and the water-out compartment 115 together form a complete cooling liquid circulation path. When a cooling liquid in the heat exchange chamber 133 is heated and expanded, the first valve 14 is pushed by increased pressure to open the first bore 1233, allowing a part of the cooling liquid to flow from the heat exchange chamber 133 through the first bore 1233 into the buffer space 1235. When the temperature of the cooling liquid drops and the pressure generated by the cooling liquid is reduced, the second valve 16, which initially closes the second bore 1234 when being pushed by pressure, is now released from the pressure and influenced by a gravitational force of the cooling liquid to open the second bore 1234; and the cooling liquid previously entered the buffer space 1235 flows through the second bore 1234 back to the heat exchange chamber 133 again.

To ensure good water tightness of the water block structure 1 and prevent the cooling liquid from leakage, a waterproof seal gasket 17 is provided at the stepped section 117, lest cooling liquid in the water block structure 1 should leak from the joint between the partitioning plate 12 and the heat absorbing member 13.

The water block structure 1 of the present invention may further include a fixing frame 2, which securely frames the top cover 11, the heat absorbing member 13, and the partitioning plate 12 simultaneously while the fixing frame 2, the top cover 11, the heat absorbing member 13, and the partitioning plate 12 are locked together along their outer edges by a plurality of fastening elements, such as screws, so that the water block structure 1 can be tightly locked and flatly attached to at least one heat source (not shown).

Please refer to FIG. 3A along with other figures. The arrows in FIG. 3A indicate a flowing direction of cooling liquid 4. As shown, the cooling liquid 4 flows from a pipe 3 into the communicable inlet 114 and water-in compartment 116 sequentially, and then flows into the heat exchange chamber 133. The cooling liquid 4 passing through the heat exchange chamber 133 rises in temperature gradually, and keeps flowing through the water-out compartment 115 to the outlet 113 and leave the water block structure 1 via another pipe 3.

Figure 3B:
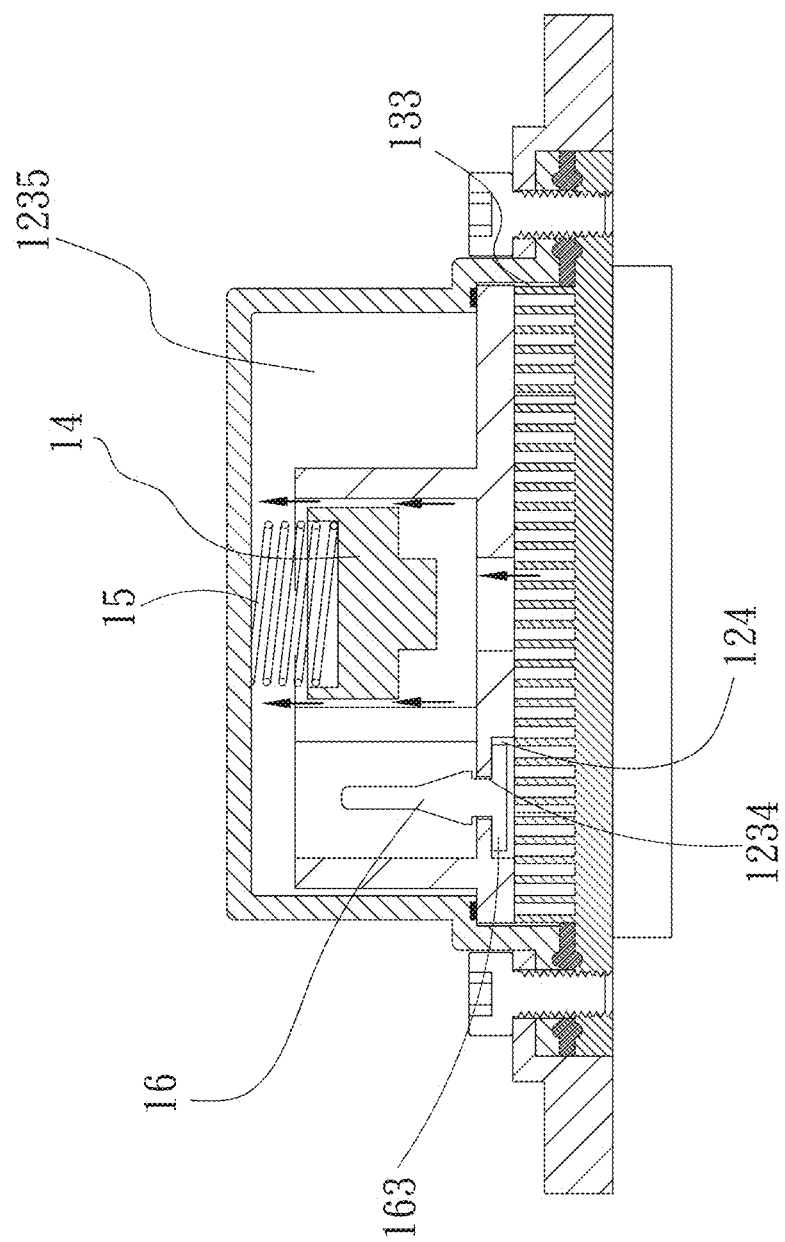
FIG. 3B is a sectional view showing the water block pressure regulation structure of the present invention in working.

Please refer to FIG. 3B, which shows the state of the water block structure 1 after the cooling liquid 4 is heated. When the cooling liquid 4 is heated and expanded (to have a reduced density), it generates outward expanded pressure against the heat exchange chamber 133. At this point, the pressure pushes the first and the second valve 14, 16 upward, such that the first valve 14 subjected to the pressure pushed upward against the elastic element 15, allowing the cooling liquid 4 to flow from the heat exchange chamber 133 through the first bore 1233 into the buffer space 1235, and the second valve 16 subjected to the pressure is moved upward by the pressure. At this point, the stopper portion 163 of the second valve 16 is fully attached to the recess 124 on the second side of the partitioning plate 12 to close the second bore 1234.

Figure 3C:
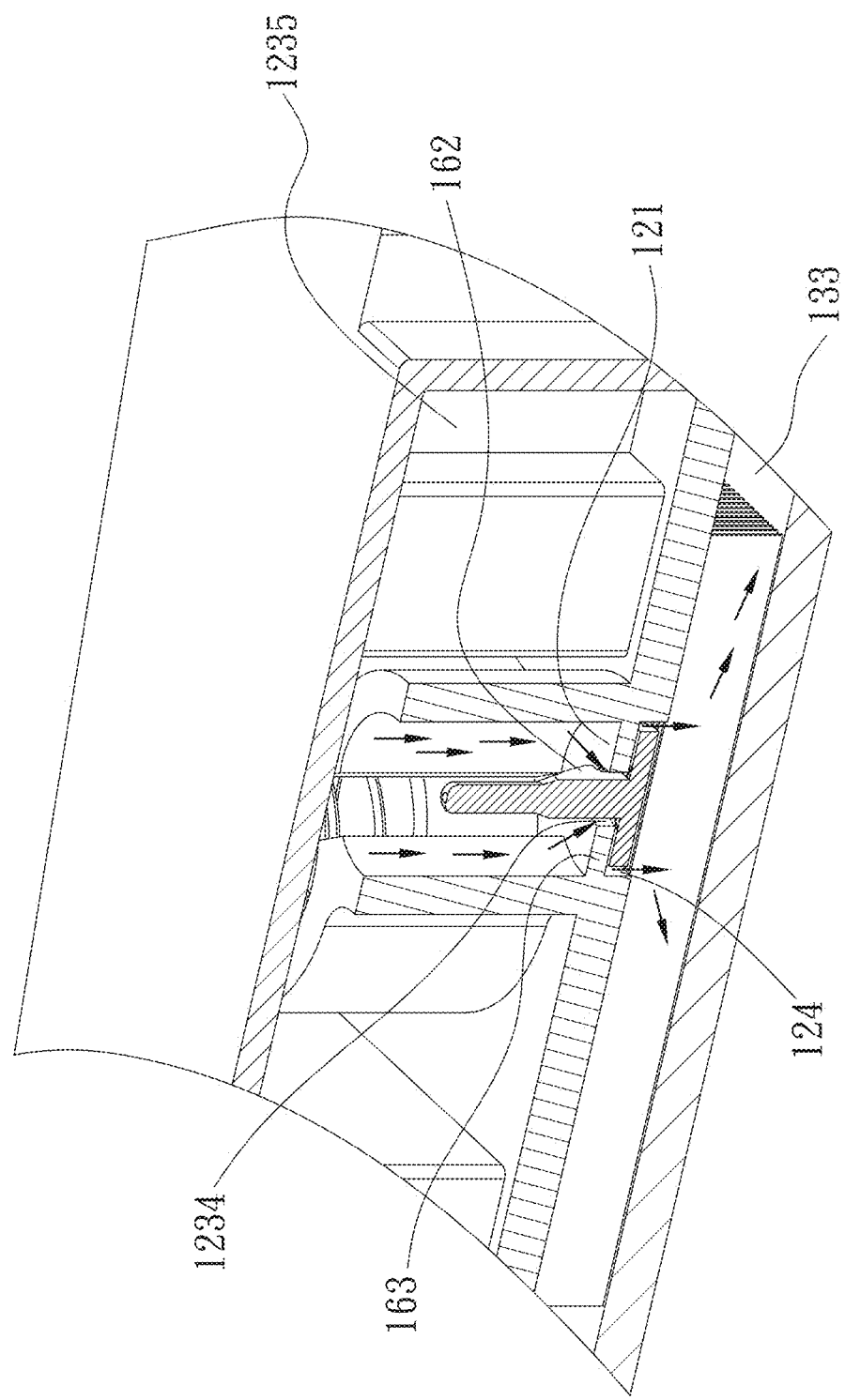
FIG. 3C is another sectional view showing the water block pressure regulation structure of the present invention in working.

Please refer to FIG. 3C, which shows the state of the water block structure 1 after the cooling liquid is cooled. As shown, when the cooling liquid 4 is lowered in temperature, it returns to its normal volume and generates less pressure. At this point, the elastic element 15 pushes the first valve 14 toward the partitioning plate 12 to close the first bore 1233; and the second valve 16 naturally moves down toward the heat exchange chamber 133 when the cooling liquid 4 flows downward under the gravitational force, such that the limiting protrusion 162 on the second valve 16 is in contact with the first side 121 of the partitioning plate 12, and a gap is formed between the stopper portion 163 and the recess 124, allowing the cooling liquid 4 in the buffer space 1235 to flow through the gap in the second bore 1234 back to the heat exchange chamber 133.

In other words, according to the present invention, the first valve 14 and the second valve 16 is changeable in their positions (i.e. can be pushed upward or fall downward) with the temperature rise and drop of the cooling liquid 4. In the present invention, the heat exchange chamber 133 and the buffer space 1235 are communicable via the first bore 1233 and the second bore 1234. When the cooling liquid 4 is heated and expanded to have an increased volume, the additional volume of the cooling liquid 4 will flow into the buffer space 1235. On the other hand, when the cooling liquid 4 is lowered in temperature, the cooling liquid 4 previously stayed in the buffer space 1235 will flow back to the heat exchange chamber 133 again.

In the above process, no additional operation is needed to handle the water block structure 1. The first and second valves 14, 16 of the water block structure 1 will move automatically to regulate the pressure in the water block structure 1 along with the rise or drop of the temperature of the heat source, so that the water block structure 1 is protected against unexpected damage due to overpressure in the cooling system.

In conclusion, the present invention has the following advantages:
(1) Being capable of regulating the internal pressure of the water block structure automatically;
(2) Without the need of replenishing the cooling liquid; and
(3) Having simple and reliable structure.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A water block pressure regulation structure, comprising:
a top cover having a pressure reduction chamber and an outlet and an inlet; the pressure reduction chamber including a water-out compartment and a water-in compartment located at positions corresponding to the outlet and the inlet, respectively;
a partitioning plate being provided on one side with an upward extended valve receiving section consisting of a first zone and a second zone, which are communicable with each other; the partitioning plate being further provided with a first bore and a second bore in the first and the second zone, respectively; the first zone having a first valve and an elastic element provided therein for opening or closing the first bore and the second zone having a second valve provided therein for opening or closing the second bore; the partitioning plate being further provided outside of the valve receiving section with a first penetrating opening and a second penetrating opening; and the pressure reduction chamber in the top cover correspondingly covering the first and the second zone to form an independent buffer space around an outer side of the first and the second zone; and
a heat absorbing member having a heat absorption surface and a heat dissipation surface; the partitioning plate being superposed on the heat absorbing member with a heat exchange chamber defined between the heat dissipation surface of the heat absorbing member and the partitioning plate; the heat exchange chamber being communicable with the water-in compartment and the water-out compartment via the inlet and the outlet, respectively, to form a cooling liquid circulation path; the buffer chamber and the heat exchange chamber being independent of each other but communicable via the first and the second bore only; wherein when the heat exchange chamber has a relatively high internal pressure or when a cooling liquid in the cooling liquid circulation path is insufficient, the first and the second valve automatically open or close the first and the second bore, respectively, to achieve regulation of pressure and replenishment of the cooling liquid in the heat exchange chamber.

2. The water block pressure regulation structure as claimed in claim 1, wherein the partitioning plate has a first side facing toward the top cover and a second side facing toward the heat absorbing member, and the heat exchange chamber being defined between the second side and the heat dissipation surface; and the first and the second penetrating opening extending through the partitioning plate.

3. The water block pressure regulation structure as claimed in claim 2, wherein the first valve being set in the first zone to close the first hole, and the elastic element being disposed in the first zone with two ends elastically pressed against the first valve and the top cover.

4. The water block pressure regulation structure as claimed in claim 2, wherein the first valve includes a protruded portion and a recessed portion; the protruded portion being faced toward the partitioning plate for correspondingly fitting in the first bore; and the recessed portion being faced toward the top cover with one end of the elastic element pressed against the recessed portion.

5. The water block pressure regulation structure as claimed in claim 2, wherein the second valve includes a valve main body, and a limiting protrusion and a stopper portion to be located at two different sides of the partitioning plate; and the valve main body extending through the second bore, such that the stopper portion covers the second bore.

6. The water block pressure regulation structure as claimed in claim 5, wherein the partitioning plate is provided on the second side with a recess for receiving the stopper portion therein.

7. The water block pressure regulation structure as claimed in claim 2, wherein the top cover has a stepped section formed at a lower open end thereof; and an area on the partitioning plate near outer edges of the first side being in contact with the stopped section.

8. The water block pressure regulation structure as claimed in claim 1, wherein the heat absorbing member is provided on the heat dissipation surface with a plurality of radiating fins, and a heat exchange flow passage being formed between any two adjacent radiating fins.

* * * * *